(12) United States Patent
Saito

(10) Patent No.: US 8,049,937 B2
(45) Date of Patent: Nov. 1, 2011

(54) IMAGE SENSOR UNIT AND IMAGE READING APPARATUS USING THE SAME

(75) Inventor: Naoto Saito, Kanagawa (JP)

(73) Assignee: Canon Components, Inc., Kawasaki-shi (JP)

( * ) Notice: Subject to any disclaimer, the term of this patent is extended or adjusted under 35 U.S.C. 154(b) by 0 days.

(21) Appl. No.: 12/921,659

(22) PCT Filed: Mar. 18, 2009

(86) PCT No.: PCT/JP2009/055350
§ 371 (c)(1),
(2), (4) Date: Sep. 9, 2010

(87) PCT Pub. No.: WO2010/106656
PCT Pub. Date: Sep. 23, 2010

(65) Prior Publication Data
US 2011/0007368 A1    Jan. 13, 2011

(51) Int. Cl.
*H04N 1/04* (2006.01)
(52) U.S. Cl. .................. 358/474; 358/471; 250/208.1
(58) Field of Classification Search .............. 358/471, 358/474, 484, 400; 250/208.1, 216
See application file for complete search history.

(56) References Cited

U.S. PATENT DOCUMENTS

| 4,826,271 | A | 5/1989 | Takahashi et al. |
| 4,842,354 | A | 6/1989 | Takahashi et al. |
| 5,431,514 | A | 7/1995 | Saito et al. |
| 7,012,235 | B2 | 3/2006 | Matsumoto |
| 2005/0161583 | A1 | 7/2005 | Matsumoto |

FOREIGN PATENT DOCUMENTS

| JP | 05-103155 A | 4/1993 |
| JP | 05-207226 A | 8/1993 |
| JP | 2005-217630 A | 8/2005 |
| JP | 2006-085004 A | 3/2006 |
| JP | 2007-177478 A | 7/2008 |
| JP | 2008-177478 A | 7/2008 |

OTHER PUBLICATIONS

PCT International Search Report and Written Opinion dated Apr. 14, 2009, in related International Application No. PCT/JP2009/055350.

*Primary Examiner* — Thomas D Lee
(74) *Attorney, Agent, or Firm* — Fitzpatrick, Cella, Harper & Scinto

(57) ABSTRACT

In a frame (8) holding a sensor board (7) with a plurality of photoelectric conversion elements ($6_k$) arranged and mounted and an imaging element (5) for focusing light reflected from an original onto the sensor board (7), the imaging element (5) includes a plurality of rod lens arrays (5) each having at least one cut end in a lengthwise direction, and cut portions of the rod lens arrays (5) are connected to each other to be tailored to a predetermined reading width, the frame (8) includes a holding section (13) for holding the rod lens arrays (5), and the holding section (13) includes a bottom surface (13B) widened at a part where a cut portion and/or a connection portion of the rod lens arrays (5) is located.

9 Claims, 6 Drawing Sheets

IMAGE SENSOR UNIT AND IMAGE READING APPARATUS USING THE SAME

TECHNICAL FIELD

The present invention relates to a contact image sensor unit and an image reading apparatus using the contact image sensor unit and, more particularly, to a long (or short) contact image sensor unit with a rod lens array and an image reading apparatus using the contact image sensor unit.

BACKGROUND ART

Image sensor units have been used as image reading apparatuses for use in, e.g., a facsimile, a copying machine, and a scanner. Among the image sensor units, a contact image sensor unit (CIS: Contact Image Sensor) is known as an image sensor unit using a rod lens array. The contact image sensor unit structurally requires a rod lens array of a length equal to the reading width of the contact image sensor. In the design of a long (or short), image sensor, use of a rod lens array of a length tailored to the reading width of the image sensor is necessary. This leads to the need for preparation of a specialized part and increased cost.

For example, Patent Document 1 proposes an image sensor unit which realizes formation of a long rod lens array 30 using general-purpose rod lens arrays by connecting (joining) rod lens arrays 30A and 30B of a fixed length to each other, in the design of a long image sensor as illustrated in FIG. 12.

Patent Document 1: Japanese Laid-open Patent Publication No. 2005-217630

SUMMARY OF THE INVENTION

Rod lens arrays tailored to the A4 size are commonly used. To tailor the contact image sensor unit described above to, e.g., the A3 size, it is necessary to cut the A4-size rod lens array 30B and connect it with the A4-size rod lens array 30A. In terms of the configuration of the rod lens array 30, rod lenses are desirably closely arranged. This configuration requires a process of cutting ends serving as connection portions of the rod lens arrays 30A and 30B and exposing rod lenses at the ends. The process causes the problem of burrs on cut surfaces. To tailor the contact image sensor unit to, e.g., the A6 size, an A4-size rod lens array needs to be cut. The cutting also causes the problem of burrs on a cut surface.

For this reason, it is necessary to manage the orientations of the rod lens arrays 30A and 30B or scrape off burrs so as to prevent the burrs from affecting a surface to which the rod lens array 30 is to be attached. This increases the number of man-hours and cost.

The present invention has been made in consideration of the above-described circumstances, and has as its object to provide an image sensor unit capable of eliminating the effects of burrs left on cut surfaces when rod lens arrays are cut without managing the orientations of the rod lens arrays before and after connection or scraping off the burrs and an image reading apparatus using the image sensor unit.

An image sensor unit according to the present invention is an image sensor unit including a sensor board with a plurality of photoelectric conversion elements mounted thereon, an original illuminating light source, an imaging element for focusing light reflected from an original onto the sensor board, and a frame for holding the sensor board, the original illuminating light source, and the imaging element, wherein the imaging element includes a plurality of rod lens arrays each having at least one cut end in a lengthwise direction, and cut portions of the rod lens arrays are connected to each other to be tailored to a predetermined reading width, the frame includes a holding section for holding the rod lens arrays, and the holding section includes a bottom surface widened at a part where a cut portion and/or a connection portion of the rod lens arrays is located and comprises a burr clearance section provided on the side of each of two wall surfaces of the holding section along the wall surface to extend from the widened part of the bottom surface toward an upper end.

The image sensor unit according to the present invention includes a plurality of adhesive agent clearance grooves intermittently provided at one side surface in a widthwise direction of the holding section to be open into the holding section, a first adhesive agent applied to cover the connection portion of the rod lens arrays, and a second adhesive agent applied into the adhesive agent clearance grooves to bond together the holding section and the rod lens arrays, and the first adhesive agent has higher hardness than the second adhesive agent.

In the image sensor unit according to the present invention, the adhesive agent clearance groove is formed on each of at least two sides of the connection portion of the rod lens arrays at the one side surface in the widthwise direction of the holding section.

An image sensor unit according to the present invention is an image sensor unit including a sensor board with a plurality of photoelectric conversion elements mounted thereon, an original illuminating light source, an imaging element for focusing light reflected from an original onto the sensor board, and a frame for holding the sensor board, the original illuminating light source, and the imaging element, wherein the imaging element includes a rod lens array cut to be tailored to a predetermined reading width, the frame includes a holding section for holding the rod lens array, and the holding section includes a bottom surface widened at a part where a cut portion of the rod lens array is located and comprises a burr clearance section provided on the side of each of two wall surfaces of the holding section along the wall surface to extend from the widened part of the bottom surface toward an upper end.

An image sensor unit according to the present invention is an image sensor unit including a sensor board with a plurality of photoelectric conversion elements mounted thereon, an original illuminating light source, an imaging element for focusing light reflected from an original onto the sensor board, and a frame for holding the sensor board, the original illuminating light source, and the imaging element, wherein the imaging element includes a plurality of rod lens arrays each having at least one cut end in a lengthwise direction, and cut portions of the rod lens arrays are connected to each other to be tailored to a predetermined reading width, the frame includes a holding section for holding the rod lens arrays, and the holding section includes a groove at a part of a bottom surface where a cut portion and/or a connection portion of the rod lens arrays is located.

The image sensor unit according to the present invention includes a plurality of adhesive agent clearance grooves intermittently provided at one side surface in a widthwise direction of the holding section to be open into the holding section, a first adhesive agent applied to cover the connection portion of the rod lens arrays, and a second adhesive agent applied into the adhesive agent clearance grooves to bond together the holding section and the rod lens arrays, and the first adhesive agent has higher hardness than the second adhesive agent.

In the image sensor unit according to the present invention, the adhesive agent clearance groove is formed on each of at least two sides of the connection portion of the rod lens arrays at the one side surface in the widthwise direction of the holding section.

An image sensor unit according to the present invention is an image sensor unit including a sensor board with a plurality of photoelectric conversion elements mounted thereon, an original illuminating light source, an imaging element for focusing light reflected from an original onto the sensor board, and a frame for holding the sensor board, the original illuminating light source, and the imaging element, wherein the imaging element includes a rod lens array cut to be tailored to a predetermined reading width, the frame includes a holding section for holding the rod lens array, and the holding section includes a groove at a part of a bottom surface where a cut portion of the rod lens array is located.

An image reading apparatus according to the present invention uses one of the above-described image sensor units.

As described above, if a rod lens array (rod lens arrays) is (are) cut and/or connected to be tailored to the reading width of a long or short image sensor, a holding section provided in a frame is widened at a part of a bottom surface where a cut portion and/or a connection portion of the rod lens array(s) is located and comprises a burr clearance section provided on the side of each of two wall surfaces of the holding section along the wall surface to extend from the widened part of the bottom surface toward an upper end. This configuration allows burrs left on a cut surface when the rod lens array(s) is (are) cut to take shelter. The effects of burrs can thus be eliminated without managing the orientation(s) of the rod lens array(s) before and after connection or scraping off the burrs.

Alternatively, the holding section provided in the frame includes a groove at a part of the bottom surface where the cut portion and/or the connection portion of the rod lens array(s) is located. This configuration allows burrs left on the cut surface when the rod lens array(s) is (are) cut to take shelter. The effects of burrs can thus be eliminated without managing the orientation(s) of the rod lens array(s) before and after connection or scraping off the burrs.

DETAILED DESCRIPTION OF THE PREFERRED EMBODIMENTS

Embodiments of the present invention will be described below in detail with reference to the drawings.

Figure 1:
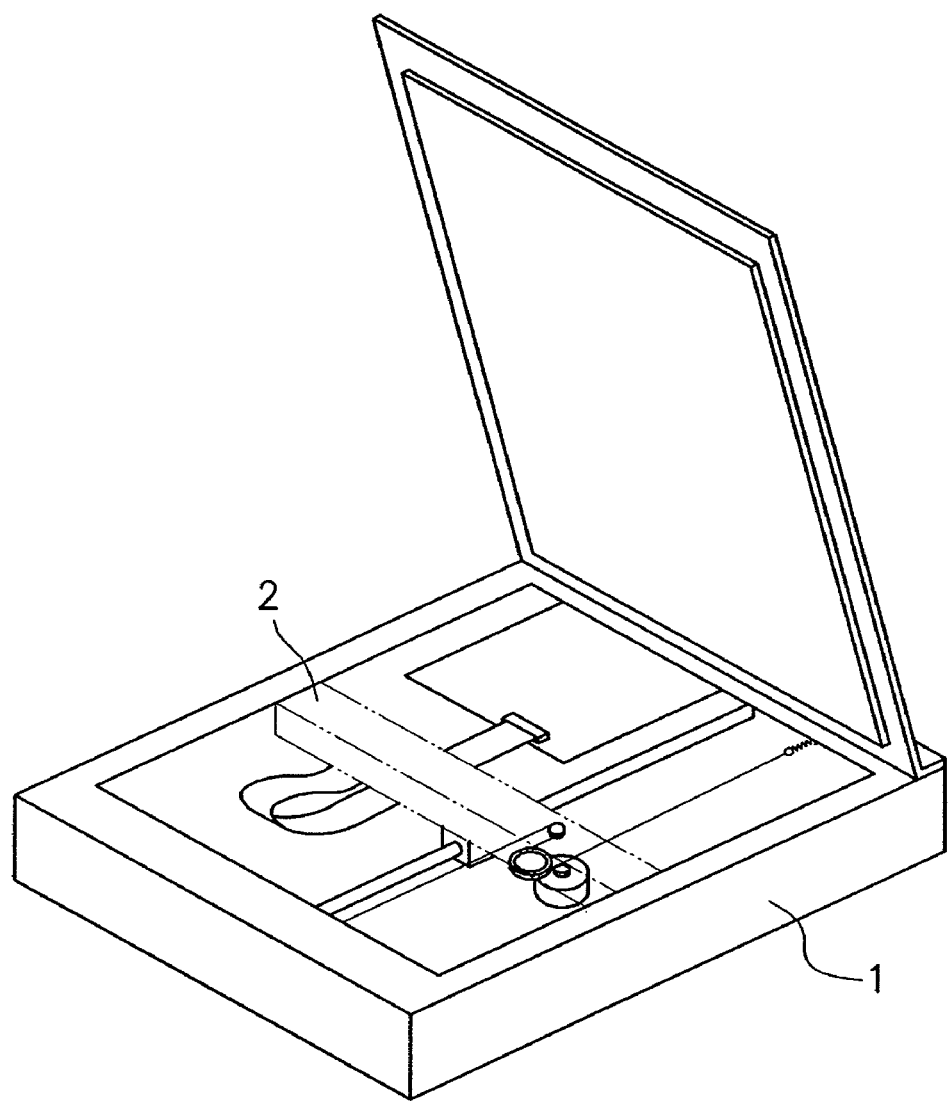
FIG. 1 is a view illustrating the structure of an image scanner to which the present invention can be applied.

FIG. 1 is a view illustrating the structure of a scanner (image reading apparatus) to which the present invention can be applied. An image sensor unit 2 is housed as a photoelectric converter in a housing 1. The image sensor unit 2 is, e.g., a contact image sensor (CIS) unit. A signal processing section (not shown) which processes a signal outputted from the image sensor unit 2 is also provided in the housing 1.

Figure 2:
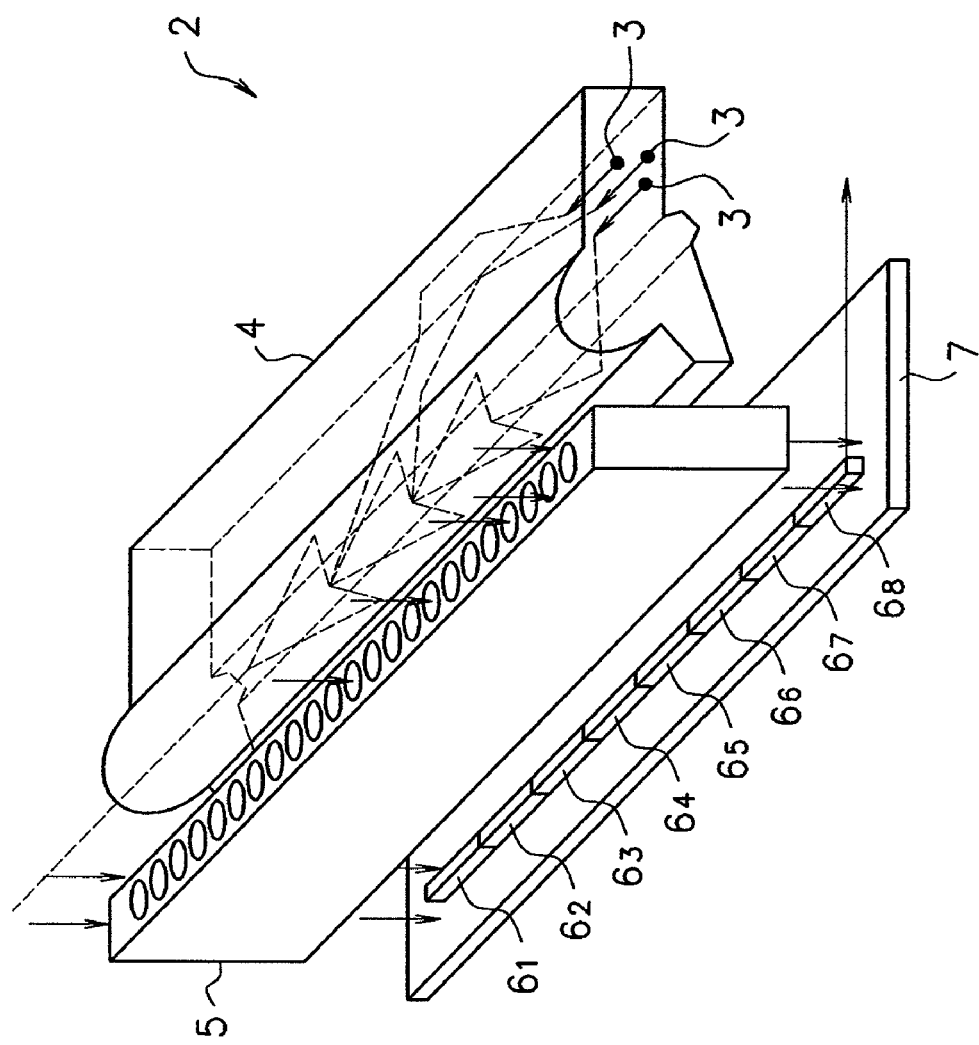
FIG. 2 is a view illustrating an image sensor unit 2.

FIG. 2 is a view illustrating the structure of the image sensor unit 2.

The image sensor unit 2 includes original illuminating light sources 3 which is composed of, e.g., an LED, a light guide 4 which guides light from the light sources 3 to an original (not shown), and a rod lens array 5 as an imaging element. The image sensor unit 2 also includes photoelectric conversion elements $6_k$ (k is a natural number from 1 to 8) which convert light focused by the rod lens array 5 into electric signals, and a sensor board 7 on which the photoelectric conversion elements $6_k$ are mounted. Note that although the number of photoelectric conversion elements is 8 in this embodiment, the number of photoelectric conversion elements is not particularly limited.

The light sources 3, the light guide 4, the rod lens array 5, and the sensor board 7 having the mounted photoelectric conversion elements $6_k$ are attached to a frame 8 as a support (to be described later). In the image sensor unit 2 with this configuration, light beams emitted from the light sources 3 are guided to an original by the light guide 4. Beams reflected from the original are focused onto the photoelectric conversion elements $6_k$ by the rod lens array 5. After that, the focused beams are converted into electric signals by the photoelectric conversion elements $6_k$, and the electric section (not shown) through the sensor board 7. In this manner, reading of the original is performed.

Figure 3:
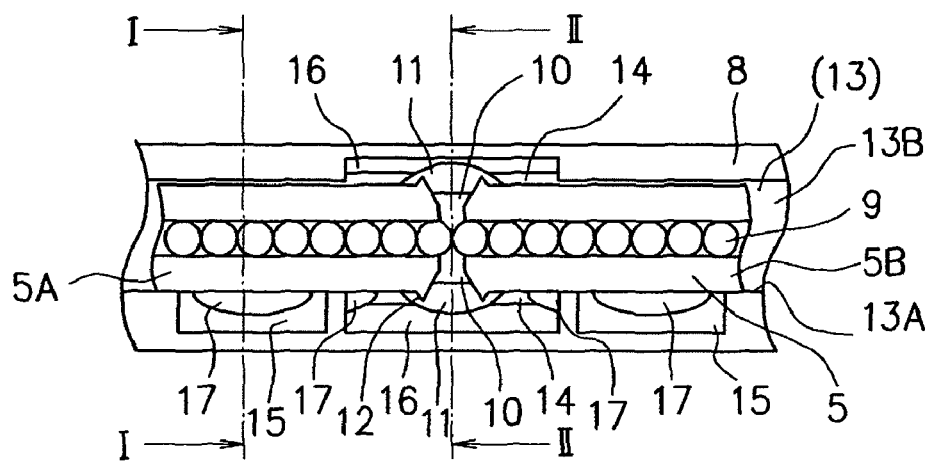
FIG. 3 is a top view illustrating the structure of a frame 8.

The relationship between the rod lens array 5 and the frame 8 if the rod lens array 5 is long will be described. FIG. 3 is a top view illustrating the structure of the frame 8, to which the present invention can be applied.

The rod lens array 5 illustrated in FIG. 3 is composed of an optical component which is formed by affixing, with opaque resin, a plurality of minute gradient index rod lenses 9 arranged to have parallel optical axes and by which one continuous erect equal magnification real image is formed. The rod lens array 5 is composed of a first rod lens array 5A and a second rod lens array 5B connected to each other.

The first rod lens array 5A is formed by cutting an A4-size rod lens array. The second rod lens array 5B is also formed by cutting an A4-size rod lens array. The connection of the first rod lens array 5A and the second rod lens array 5B tailors the rod lens array 5 to the A3 size. Connection surfaces of the first rod lens array 5A and the second rod lens array 5B are each formed by cutting, and the first rod lens array 5A and the second rod lens array 5B are closely arranged such that the rod lens 9 at a connection portion of the first rod lens array 5A and the rod lens 9 at a connection portion of the second rod lens array 5B are in contact with each other. The gap between the adjacently arranged rod lenses 9 of the rod lens array 5 is filled with a sealing agent 10 made of, e.g., a black silicon-based resin adhesive agent with light blocking effects, and the rod lens array 5 can block light from the outside with this configuration. A first adhesive agent 11 is applied to cover the sealing agent 10, and the first rod lens array 5A and the second rod lens array 5B are connected to each other.

Figure 4:
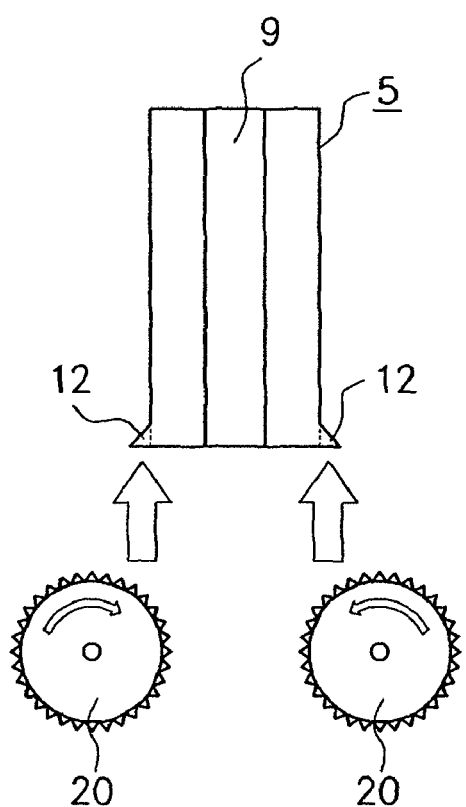
FIG. 4 is a schematic view illustrating how a rod lens array 5 is cut.

When each of the first rod lens array 5A and the second rod lens array 5B is cut, a burr 12 about 0.1 mm long in a direction perpendicular to a focus direction is left on each side in a widthwise direction (see FIG. 4). For this reason, when the rod lens array 5 is to be fixed to the frame 8, it is necessary to manage the orientations of the rod lens arrays 5A and 5B or to provide shelter to the burrs 12 so as to prevent the burrs 12 from affecting a surface to which the rod lens array 5 is to be attached. Note that reference numeral 20 in FIG. 4 designates a blade for cutting.

More specifically, the frame 8 includes a groove-like holding section 13 which holds the rod lens array 5. The holding section 13 includes a contact surface 13A (one wall surface of the holding section 13) and a bottom surface 13B, at which the holding section 13 comes into contact with the rod lens array 5. The frame 8 also includes burr clearance sections 14 flush with the bottom surface 13B. The burr clearance sections 14 are formed by widening the bottom surface 13B at a part where the connection portions of the rod lens array 5 are located. The burr clearance sections 14 are provided on two sides in a widthwise direction of the bottom surface 13B.

Note that the burr clearance sections 14 are provided not only at a place where the connection portions of the rod lens array 5 are located but on the two wall surface sides of a part of the bottom surface 13B where a cut portion of the rod lens array 5 is located. More specifically, one or two ends of the rod lens array 5 formed by connection may be cut to serve as cut portions for, e.g., adjusting the length of the connected rod lens array 5. In this case, since burrs are also left on the cut portions, the burr clearance sections 14 may be provided on the two wall surface sides of parts of the bottom surface 13B where the cut portions of the rod lens array 5 are located, as described above. The burr clearance sections 14 formed by widening the bottom surface 13B at the parts where the cut portions and/or the connection portions of the rod lens array 5 are located provided in the above-described manner.

The frame 8 also includes an adhesive agent clearance groove 15. A plurality of adhesive agent clearance grooves 15 are intermittently provided at the contact surface 13A to be open into the holding section 13 provided in the frame 8. The frame 8 further includes connection portion clearance grooves 16. The connection portion clearance grooves 16 are provided at positions corresponding to the connection portions of the rod lens array 5 at the contact surface 13A and a wall surface opposite to the contact surface 13A to be open into the holding section 13 provided in the frame 8.

Figure 5:
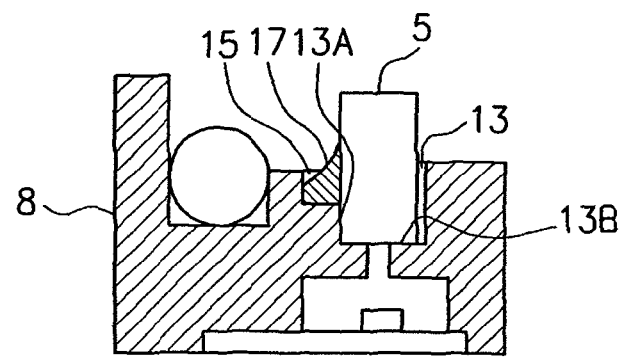
FIG. 5 is a sectional view taken along line I-I illustrating the structure of the frame 8.
Figure 6:
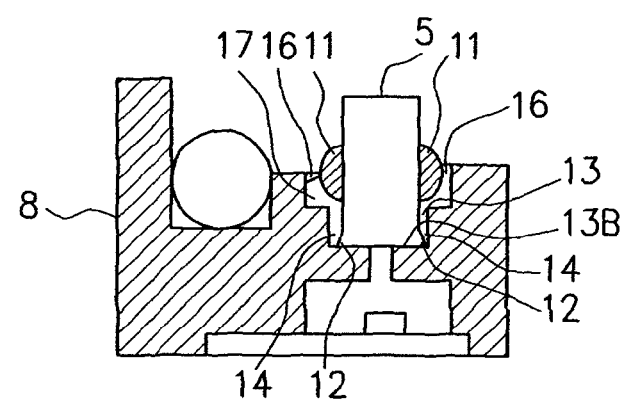
FIG. 6 is a sectional view taken along line II-II illustrating the structure of the frame 8.

With this configuration, the rod lens array 5 is brought into intimate contact with the contact surface 13A and the bottom surface 13B with use of, e.g., a spacer (not shown) to fix the rod lens array 5 to the frame 8. After that, a second adhesive agent 17 is applied to spots close to each other across the connection portions (the sealing agent 10) of the rod lens array 5 inside the connection portion clearance groove 16 and into the adhesive agent clearance grooves 15 intermittently provided in a lengthwise direction. The rod lens array 5 and the frame 8 are fixed to each other over a predetermined reading width (see FIGS. 5 and 6).

When the connection portions of the rod lens array 5 are brought into contact with the bottom surface 13B, the connection portions of the rod lens array 5 can take shelter in the connection portion clearance grooves 16. Of the burrs 12 left when the rod lens arrays 5A and 5B are cut, ones at the side surface on the contact surface 13A side can take shelter in the corresponding burr clearance section 14, and ones at the side surface on the side opposite to the contact surface 13A can take shelter in a space in the holding section 13 formed when the rod lens array 5 is fixed and in the corresponding burr clearance section 14.

For this reason, the first rod lens array 5A and the second rod lens array 5B constituting the rod lens array 5 can be held in series in the frame 8 without the effects of the burrs 12.

In this embodiment, if rod lens arrays are connected to be tailored to the reading width of a long image sensor, the burr clearance sections 14 are provided in the holding section 13 provided in the frame 8. This configuration allows the burrs 12 left when the rod lens array 5 is cut to take shelter. The effects of burrs can thus be eliminated without managing the orientations of the rod lens arrays before and after connection or scraping off the burrs.

Since the second adhesive agent 17 is applied only to the contact surface 13A side of the rod lens array 5, the effects of shrinkage, distortion, or the like upon curing of the second adhesive agent 17 can be limited to one side of the rod lens array 5. Accordingly, effects from the two sides of the rod lens array 5 can be eliminated, and the effects of a gap, a shift, a tilt, or the like between the rod lenses 9 on the connection portions can be reduced.

Since the second adhesive agent 17 is applied to the spots close to each other on two sides of the sealing agent 10, shrinkage, distortion, or the like upon curing of the second adhesive agent 17 occurs at the position of each spot as the starting point. The effects of shrinkage, distortion, or the like can be transferred toward the two ends in the lengthwise direction of the rod lens array 5. For this reason, a further reduction in the effects of a gap, a shift, a tilt, or the like between the rod lenses 9 of the connection portions can be expected.

If the hardness of the first adhesive agent 11 is made higher than that of the second adhesive agent 17, the effects of expansion and contraction of the second adhesive agent 17 caused by temperature and humidity or the like on the first adhesive agent 11 can be reduced. In this case, the effects of a gap, a shift, a tilt, or the like between the rod lenses 9 of the connection portions can be reduced.

Figure 7:
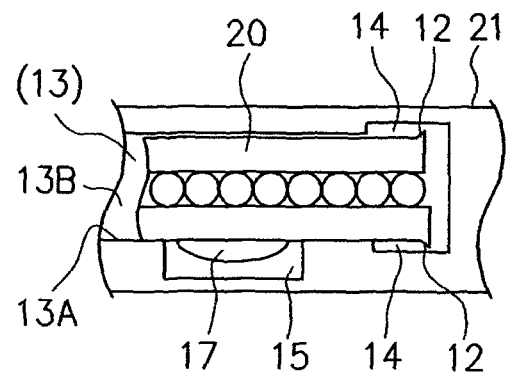
FIG. 7 is a top view illustrating the structure of a frame 21.

The relationship between a rod lens array 20 and a frame 21 if the rod lens array 20 is short will be described. FIG. 7 is a top view illustrating the structure of the frame 21, to which the present invention can be applied.

The rod lens array 20 illustrated in FIG. 7 is formed by cutting an A4-size rod lens array and is tailored to the A4 size or a smaller size.

The frame 21 includes the groove-like holding section 13 which holds the rod lens array 20. The holding section 13 includes the contact surface 13A (one wall surface of the holding section 13) and the bottom surface 13B, at which the holding section 13 comes into contact with the rod lens array 20. The holding section 13 also includes the burr clearance sections 14 flush with the bottom surface 13B. The burr clearance sections 14 are formed by widening the bottom surface 13B at a part where a cut portion serving as an endmost portion in a lengthwise direction of the rod lens array 20 is located. The burr clearance sections 14 are provided on two sides in a widthwise direction of the bottom surface 13B.

The frame 21 also includes the adhesive agent clearance groove 15. A plurality of adhesive agent clearance grooves 15 are intermittently provided at the contact surface 13A to be open into the holding section 13 provided in the frame 21.

With this configuration, the rod lens array 20 is brought into intimate contact with the contact surface 13A and the bottom surface 13B with use of, e.g., a spacer (not shown) to fix the rod lens array 20 to the frame 21. After that, the second adhesive agent 17 is applied into the adhesive agent clearance grooves 15 intermittently provided in the lengthwise direction. The rod lens array 20 and the frame 21 are fixed to each other over a predetermined reading width.

At this time, of the burrs 12 left when the rod lens array 20 is cut, one at the side surface on the contact surface 13A side can take shelter in the corresponding burr clearance section 14, and one at the side surface on the side opposite to the contact surface 13A can take shelter in a space in the holding section 13 formed when the rod lens array 20 is fixed and in the corresponding burr clearance section 14.

In this embodiment, if a rod lens array is cut to be tailored to the reading width of a short image sensor, the burr clearance sections 14 are provided in the holding section 13 provided in the frame 21. This configuration allows the burrs 12 left when the rod lens array 20 is cut to take shelter. The effects of burrs can thus be eliminated without managing the orientation of the rod lens array before and after connection or scraping off the burrs.

Since the second adhesive agent 17 is applied only to the contact surface 13A side of the rod lens array 20, the effects of shrinkage, distortion, or the like upon curing of the second adhesive agent 17 can be limited to one side of the rod lens array 20. Accordingly, effects from the two sides of the rod lens array 20 can be eliminated, and the effects of a positional shift in the widthwise direction, a tilt, or the like of the rod lens array 20 can be reduced.

Other Embodiment

Figure 8:
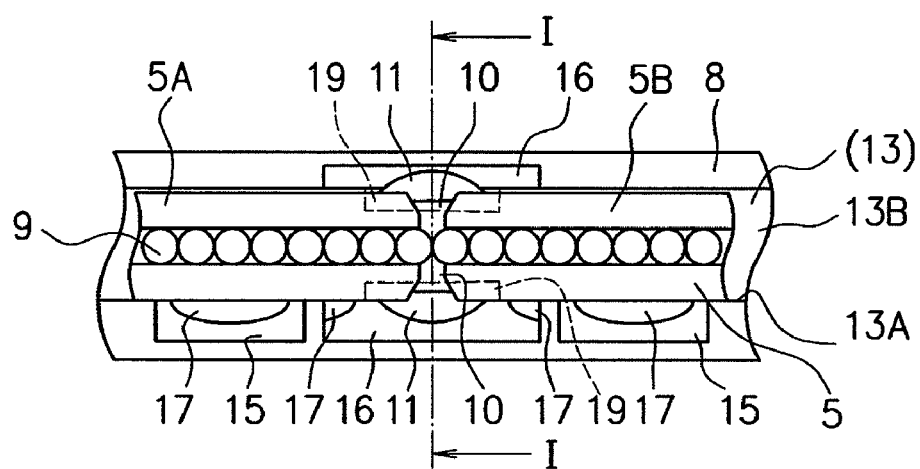
FIG. 8 is a top view illustrating the structure of a different frame 8.

FIG. 8 is a top view illustrating the structure of a different frame 8 to which the present invention can be applied.

Figure 9:
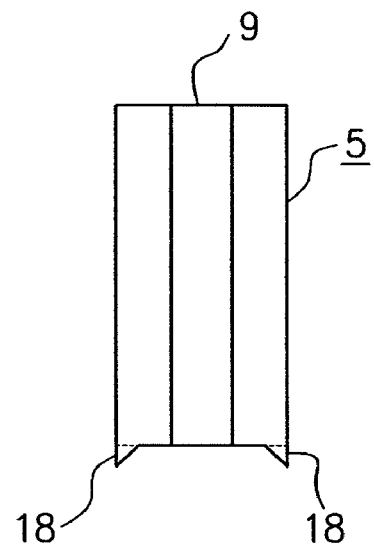
FIG. 9 is a schematic view illustrating how a different rod lens array 5 is cut.

In a rod lens array 5 illustrated in FIG. 8, a burr 18 about 0.1 mm long in a focus direction may be left on each side in a widthwise direction when a first rod lens array 5A and a second rod lens array 5B are cut, depending on how the first rod lens array 5A and the second rod lens array 5B are cut (see FIG. 9). For this reason, when the rod lens array 5 is to be fixed to the frame 8, it is necessary to manage the orientations of the rod lens arrays 5A and 5B or to provide shelter to the burrs 18 so as to prevent the burrs 18 from affecting a surface to which the rod lens array 5 is to be attached.

More specifically, the frame 8 includes a groove-like holding section 13 which holds the rod lens array 5. The holding section 13 includes a contact surface 13A (one wall surface of the holding section 13) and a bottom surface 13B, at which the holding section 13 comes into contact with the rod lens array 5. The frame 8 also includes a pair of burr clearance grooves 19 at the bottom surface 13B. The burr clearance grooves 19 are not always provided in a pair. The number and size of burr clearance grooves 19 can be changed depending on the number and size of burrs.

Note that the burr clearance grooves 19 are provided not only at a place where connection portions of the rod lens array 5 are located but at a part of the bottom surface 13B where a cut portion of the rod lens array 5 is located. More specifically, one or two ends of the rod lens array 5 formed by connection may be cut to serve as cut potions for, e.g., adjusting the length of the connected rod lens array 5. In this case, since burrs are also left on the cut portions, the burr clearance grooves 19 may be provided at parts of the bottom surface 13B where the cut portions of the rod lens array 5 are located, as described above. The burr clearance grooves 19 are provided at the parts of the bottom surface 13B where the cut portions and/or the connection portions of the rod lens array 5 are located in the above-described manner.

The frame 8 also includes an adhesive agent clearance groove 15. A plurality of adhesive agent clearance grooves 15 are intermittently provided at the contact surface 13A to be open into the holding section 13 provided in the frame 8. The frame 8 further includes connection portion clearance grooves 16. The connection portion clearance grooves 16 are provided at positions corresponding to the connection portions of the rod lens array 5 at the contact surface 13A and a wall surface opposite to the contact surface 13A to be open into the holding section 13 provided in the frame 8.

Figure 10:
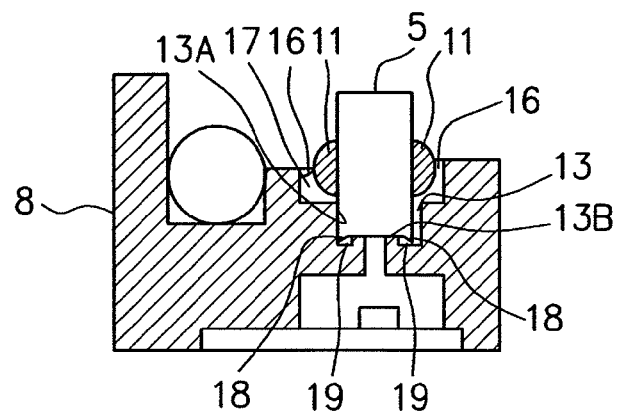
FIG. 10 is a sectional view taken along line I-I illustrating the structure of the different frame 8.

With this configuration, the rod lens array 5 is brought into intimate contact with the contact surface 13A and the bottom surface 13B with use of, e.g., a spacer (not shown) to fix the rod lens array 5 to the frame 8. After that, a second adhesive agent 17 is applied to spots close to each other across the connection portions (a sealing agent 10) of the rod lens array 5 inside the connection portion clearance groove 16 and into the adhesive agent clearance grooves 15 intermittently provided in a lengthwise direction. The rod lens array 5 and the frame 8 are fixed to each other over a predetermined reading width (see also FIG. 10).

When the connection portions of the rod lens array 5 are brought into contact with the bottom surface 13B, the connection portions of the rod lens array 5 can take shelter in the connection portion clearance grooves 16. The burrs 18 left when the rod lens arrays 5A and 5B are cut can take shelter in the burr clearance grooves 19.

For this reason, the first rod lens array 5A and the second rod lens array 5B constituting the rod lens array 5 can be held in series in the frame 8 without the effects of the burrs 18.

In this embodiment, if rod lens arrays are connected to be tailored to the reading width of a long image sensor, the pair of burr clearance grooves 19 are provided in the holding section 13 provided in the frame 8. This configuration allows the burrs 18 left when the rod lens array 5 is cut to take shelter. The effects of burrs can thus be eliminated without managing the orientations of the rod lens arrays before and after connection or scraping off the burrs.

Since the second adhesive agent 17 is applied only to the contact surface 13A side of the rod lens array the effects of shrinkage, distortion, or the like upon curing of the second adhesive agent 17 can be limited to one side of the rod lens array 5. Accordingly, effects from the two sides of the rod lens array 5 can be eliminated, and the effects of a gap, a shift, a tilt, or the like between rod lenses 9 on the connection portions can be reduced.

Since the second adhesive agent 17 is applied to the spots close to each other on two sides of the sealing agent 10, shrinkage, distortion, or the like upon curing of the second adhesive agent 17 occurs at the position of each spot as the starting point. The effects of shrinkage, distortion, or the like can be transferred toward the two ends in the lengthwise direction of the rod lens array 5. For this reason, a further reduction in the effects of a gap, a shift, a tilt, or the like between the rod lenses 9 of the connection portions can be expected.

If the hardness of a first adhesive agent 11 is made higher than that of the second adhesive agent 17, the effects of expansion and contraction of the second adhesive agent 17 caused by temperature and humidity or the like on the first adhesive agent 11 can be reduced. In this case, the effects of a gap, a shift, a tilt, or the like between the rod lenses 9 of the connection portions can be reduced.

Figure 11:
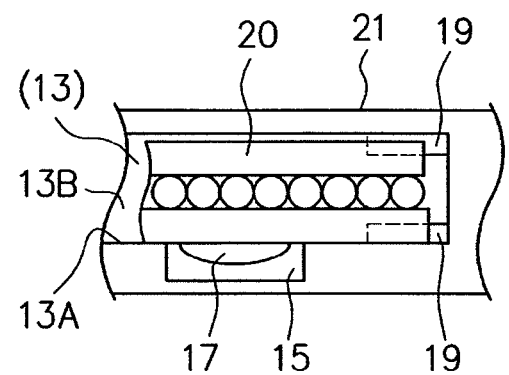
FIG. 11 is a top view illustrating the structure of a different frame 21.
Figure 12:
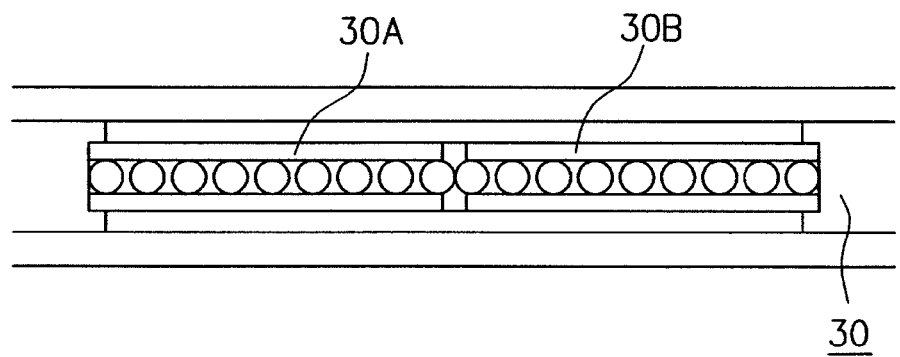
FIG. 12 is a view illustrating a contact image sensor unit disclosed in Patent Document 1.

The relationship between a rod lens array 20 and a frame 21 if the rod lens array 20 is short will be described. FIG. 11 is a top view illustrating the structure of the different frame 21, to which the present invention can be applied.

The rod lens array 20 illustrated in FIG. 11 is formed by cutting an A4-size rod lens array and is tailored to the A4 size or a smaller size.

The frame 21 includes the groove-like holding section 13 which holds the rod lens array 20. The holding section 13 includes the contact surface 13A (one wall surface of the holding section 13) and the bottom surface 13B, at which the holding section 13 comes into contact with the rod lens array

20. The holding section 13 also includes the pair of burr clearance grooves 19 at the bottom surface 13B. The burr clearance grooves 19 are provided at a part of the bottom surface 13B where a cut portion serving as an endmost portion of the rod lens array 20 is located. Note that the burr clearance grooves 19 are not always provided in a pair. The number and size of burr clearance grooves 19 can be changed depending on the number and size of burrs.

The frame 21 also includes the adhesive agent clearance groove 15. A plurality of adhesive agent clearance grooves 15 are intermittently provided at the contact surface 13A to be open into the holding section 13 provided in the frame 21.

With this configuration, the rod lens array 20 is brought into intimate contact with the contact surface 13A and the bottom surface 13B with use of, e.g., a spacer (not shown) to fix the rod lens array 20 to the frame 21. After that, the second adhesive agent 17 is applied into the adhesive agent clearance grooves 15 intermittently provided in the lengthwise direction. The rod lens array 20 and the frame 21 are fixed to each other over a predetermined reading width.

At this time, the burrs 18 left when the rod lens array 20 is cut can take shelter in the burr clearance grooves 19.

In this embodiment, if a rod lens array is cut to be tailored to the reading width of a short image sensor, the pair of burr clearance grooves 19 are provided in the holding section 13 provided in the frame 21. This configuration allows the burrs 18 left when the rod lens array 20 is cut to take shelter. The effects of burrs can thus be eliminated without managing the orientation of the rod lens array before and after connection or scraping off the burrs.

Since the second adhesive agent 17 is applied only to the contact surface 13A side of the rod lens array 20, the effects of shrinkage, distortion, or the like upon curing of the second adhesive agent 17 can be limited to one side of the rod lens array 20. Accordingly, effects from the two sides of the rod lens array 20 can be eliminated, and the effects of a positional shift in a widthwise direction, a tilt, or the like of the rod lens array 20 can be reduced.

Note that rod lens arrays used for the rod lens array 5 are not limited to the A4 size. Any number of rod lens arrays may be connected as needed. The rod lens array 5 may include a mixture of connection portions and cut portions.

INDUSTRIAL APPLICABILITY

A contact image sensor unit according to the present invention is a technique effective as an image reading apparatus such as an image scanner, a facsimile, or a copying machine.

What is claimed is:

1. An image sensor unit comprising:
a sensor board with a plurality of photoelectric conversion elements mounted thereon;
an original illuminating light source;
an imaging element for focusing light reflected from an original onto the sensor board; and
a frame for holding the sensor board, the original illuminating light source, and the imaging element,
wherein the imaging element comprises a plurality of rod lens arrays each having at least one cut end in a lengthwise direction, and cut portions of the rod lens arrays are connected to each other to be tailored to a predetermined reading width,
the frame comprises a holding section for holding the rod lens arrays, and
the holding section comprises a bottom surface widened at a part where a cut portion and/or a connection portion of the rod lens arrays is located and comprises a burr clearance section provided on the side of each of two wall surfaces of the holding section along the wall surface to extend from the widened part of the bottom surface toward an upper end.

2. The image sensor unit according to claim 1, comprising:
a plurality of adhesive agent clearance grooves intermittently provided at one side surface in a widthwise direction of the holding section to be open into the holding section;
a first adhesive agent applied to cover the connection portion of the rod lens arrays; and
a second adhesive agent applied into the adhesive agent clearance grooves to bond together the holding section and the rod lens arrays, wherein
the first adhesive agent has higher hardness than the second adhesive agent.

3. The image sensor unit according to claim 2, wherein the adhesive agent clearance groove is formed on each of at least two sides of the connection portion of the rod lens arrays at the one side surface in the widthwise direction of the holding section.

4. An image reading apparatus using an image sensor unit according to claim 1.

5. An image sensor unit comprising:
a sensor board with a plurality of photoelectric conversion elements mounted thereon;
an original illuminating light source;
an imaging element for focusing light reflected from an original onto the sensor board; and
a frame for holding the sensor board, the original illuminating light source, and the imaging element,
wherein the imaging element comprises a rod lens array cut to be tailored to a predetermined reading width,
the frame comprises a holding section for holding the rod lens array, and
the holding section comprises a bottom surface widened at a part where a cut portion of the rod lens array is located and comprises a burr clearance section provided on the side of each of two wall surfaces of the holding section along the wall surface to extend from the widened part of the bottom surface toward an upper end.

6. An image sensor unit comprising:
a sensor board with a plurality of photoelectric conversion elements mounted thereon;
an original illuminating light source;
an imaging element for focusing light reflected from an original onto the sensor board; and
a frame for holding the sensor board, the original illuminating light source, and the imaging element,
wherein the imaging element comprises a plurality of rod lens arrays each having at least one cut end in a lengthwise direction, and cut portions of the rod lens arrays are connected to each other to be tailored to a predetermined reading width,
the frame comprises a holding section for holding the rod lens arrays, and
the holding section comprises a groove at a part of a bottom surface where a cut portion and/or a connection portion of the rod lens arrays is located.

7. The image sensor unit according to claim 6, comprising:
a plurality of adhesive agent clearance grooves intermittently provided at one side surface in a widthwise direction of the holding section to be open into the holding section;
a first adhesive agent applied to cover the connection portion of the rod lens arrays; and a second adhesive agent applied into the adhesive agent clearance grooves to bond together the holding section and the rod lens arrays, wherein
the first adhesive agent has higher hardness than the second adhesive agent.

8. The image sensor unit according to claim 7, wherein the adhesive agent clearance groove is formed on each of at least two sides of the connection portion of the rod lens arrays at the one side surface in the widthwise direction of the holding section.

9. An image sensor unit comprising:
a sensor board with a plurality of photoelectric conversion elements mounted thereon;
an original illuminating light source;
an imaging element for focusing light reflected from an original onto the sensor board; and
a frame for holding the sensor board, the original illuminating light source, and the imaging element,
wherein the imaging element comprises a rod lens array cut to be tailored to a predetermined reading width,
the frame comprises a holding section for holding the rod lens array, and
the holding section comprises a groove at a part of a bottom surface where a cut portion of the rod lens array is located.

* * * * *